US012775141B2

(12) United States Patent
Kobayashi

(10) Patent No.: US 12,775,141 B2
(45) Date of Patent: Oct. 27, 2026

(54) FERRULE, OPTICAL CONNECTOR, AND METHOD FOR MANUFACTURING FERRULE

(71) Applicant: HAKUSAN INC., Ishikawa (JP)

(72) Inventor: Moriaki Kobayashi, Ishikawa (JP)

(73) Assignee: HAKUSAN INC., Ishikawa (JP)

( * ) Notice: Subject to any disclaimer, the term of this patent is extended or adjusted under 35 U.S.C. 154(b) by 327 days.

(21) Appl. No.: 18/708,646

(22) PCT Filed: Sep. 16, 2022

(86) PCT No.: PCT/JP2022/034820

§ 371 (c)(1),
(2) Date: May 9, 2024

(87) PCT Pub. No.: WO2023/084918

PCT Pub. Date: May 19, 2023

(65) Prior Publication Data

US 2025/0028126 A1 Jan. 23, 2025

(30) Foreign Application Priority Data

Nov. 12, 2021 (JP) ................................ 2021-184482

(51) Int. Cl.
*G02B 6/36* (2006.01)
*G02B 6/38* (2006.01)

(52) U.S. Cl.
CPC ....... *G02B 6/38875* (2021.05); *G02B 6/3854* (2013.01)

(58) Field of Classification Search
CPC .............. G02B 6/38875; G02B 6/3854; G02B 6/3865; G02B 6/3882; G02B 6/3861; G02B 6/36
See application file for complete search history.

(56) References Cited

U.S. PATENT DOCUMENTS 5,602,951 A 2/1997 Shiota et al.
7,264,410 B1 * 9/2007 Doss .................... G02B 6/3806 385/98

(Continued)

FOREIGN PATENT DOCUMENTS

CN 206601505 U 10/2017
CN 111323881 A 6/2020

(Continued)

OTHER PUBLICATIONS

International Search Report (ISR) dated Oct. 25, 2022 filed in PCT/JP2022/034820.

*Primary Examiner* — Jennifer Doan

(74) *Attorney, Agent, or Firm* — Rankin, Hill & Clark LLP

(57) ABSTRACT

Provided is a ferrule (100) in which fiber holes (20, 25) for insertion of a plurality of optical fibers are provided in a front end surface (100*a*), and a boot insertion hole (35) of a boot insertion part (30) for inserting a ferrule boot (102) through which optical fibers are inserted is provided in a rear end surface (100*b*), wherein the ferrule (100) comprises an internal space that communicates the fiber holes (20) and the boot insertion hole (35), an adhesive filling window (55) of an adhesive filling part (50) for filling the internal space with an adhesive is provided in one surface, the width of the ferrule (100) in the boot insertion part (30) is larger than the width of the ferrule body (10), the ratio of the width to the height of the ferrule (100) in the boot insertion part (30) is 5 or greater, and the wall thickness of the ferrule (100) on the periphery of the boot insertion hole (35) at the thinnest portion thereof is 0.32 mm or greater.

8 Claims, 10 Drawing Sheets

(56) References Cited

U.S. PATENT DOCUMENTS

| | | | | |
|---|---|---|---|---|
| 9,778,423 | B2 | 10/2017 | Watanabe et al. | |
| 10,031,298 | B2 * | 7/2018 | Newbury ............. | G02B 6/3893 |
| 12,436,343 | B2 * | 10/2025 | Merriken ............. | G02B 6/3833 |
| 2002/0168151 | A1 | 11/2002 | Murayama et al. | |
| 2011/0262079 | A1 | 10/2011 | Kato et al. | |

FOREIGN PATENT DOCUMENTS

| | | | |
|---|---|---|---|
| JP | H0415606 | A | 1/1992 |
| JP | H0763945 | A | 3/1995 |
| JP | 2001108867 | A | 4/2001 |
| JP | 2001264585 | A | 9/2001 |
| JP | 2002328264 | A | 11/2002 |
| JP | 2004020962 | A | 1/2004 |
| JP | 2004209790 | A | 7/2004 |
| JP | 2007279576 | A | 10/2007 |
| JP | 2017016013 | A | 1/2017 |
| JP | 3222482 | U | 8/2019 |
| WO | 2019177068 | A1 | 9/2019 |
| WO | 2021049540 | A1 | 3/2021 |

* cited by examiner

[Fig1]
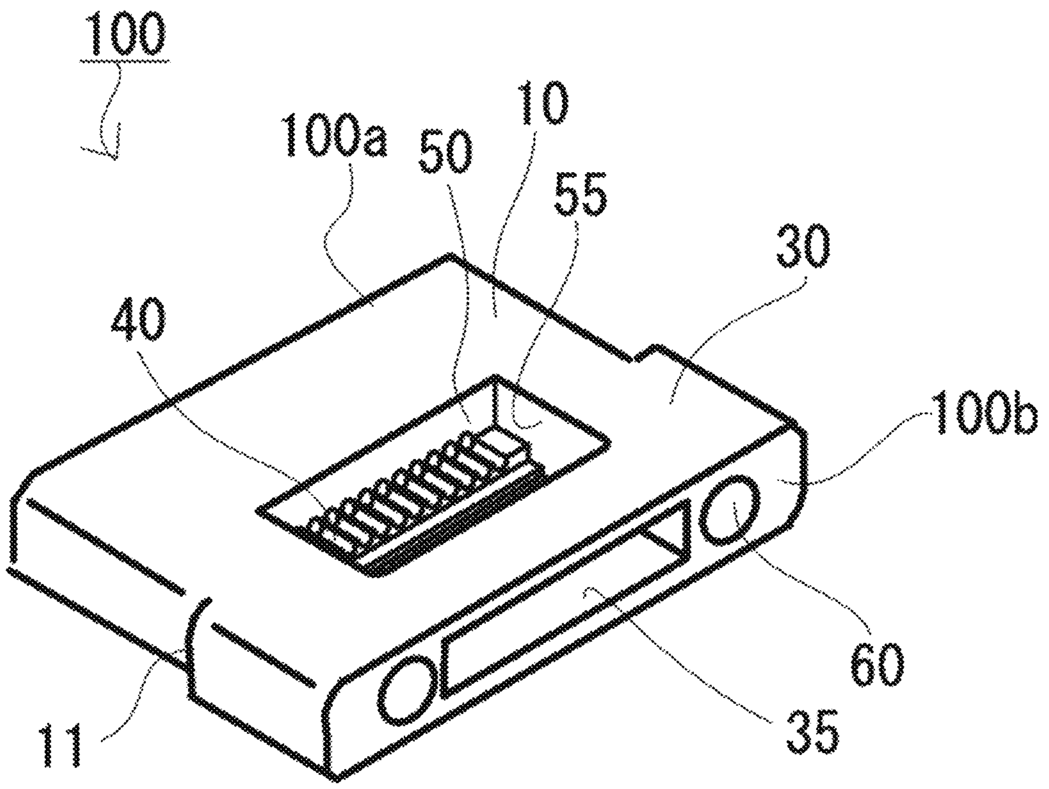

[Fig2]
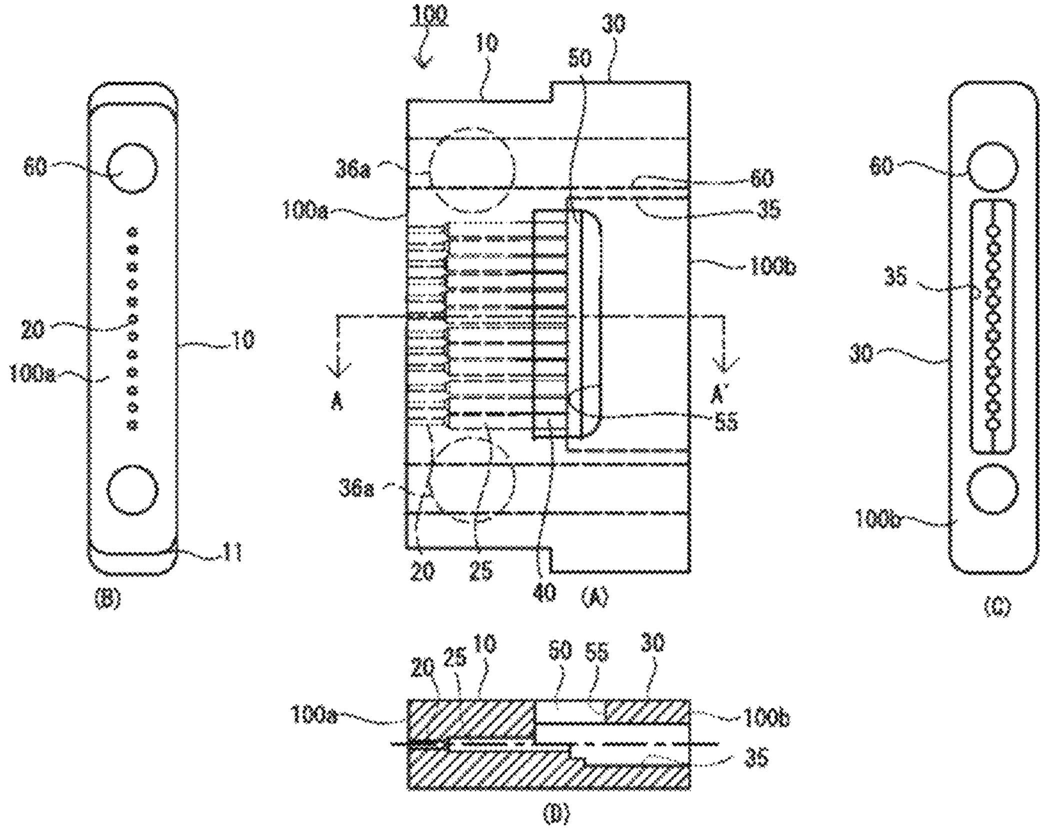

[Fig3]
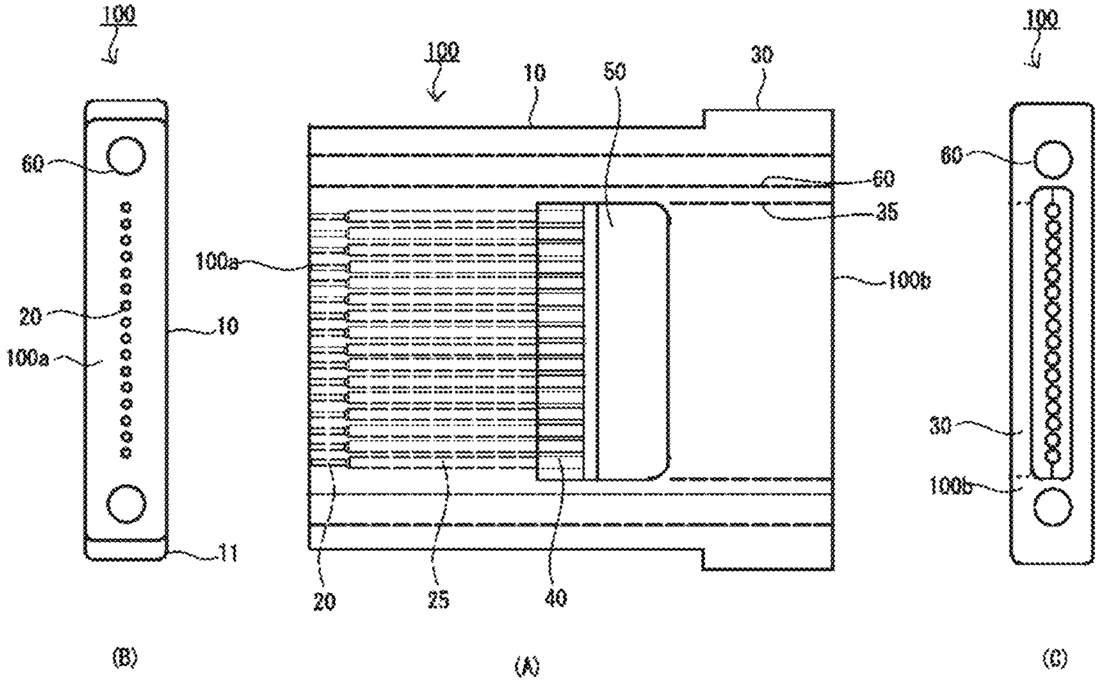

[Fig4]
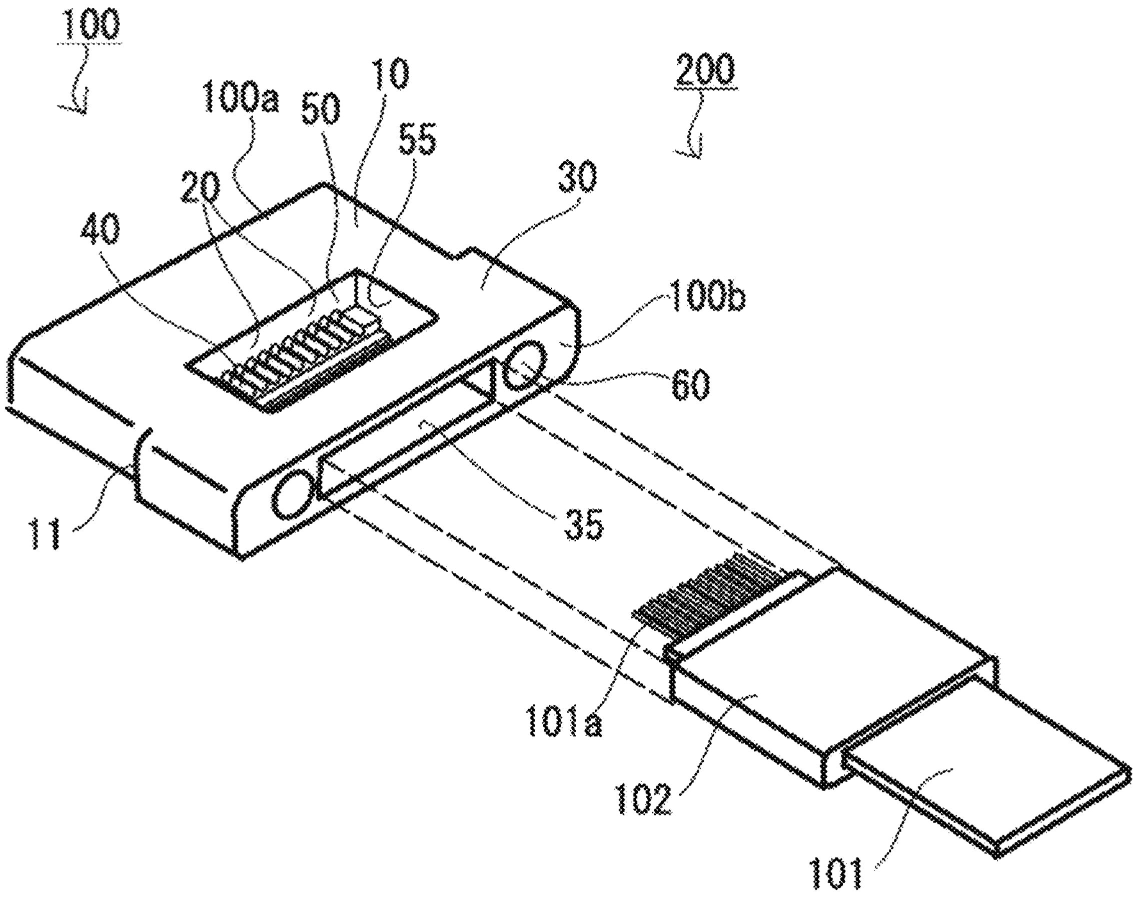

[Fig5]
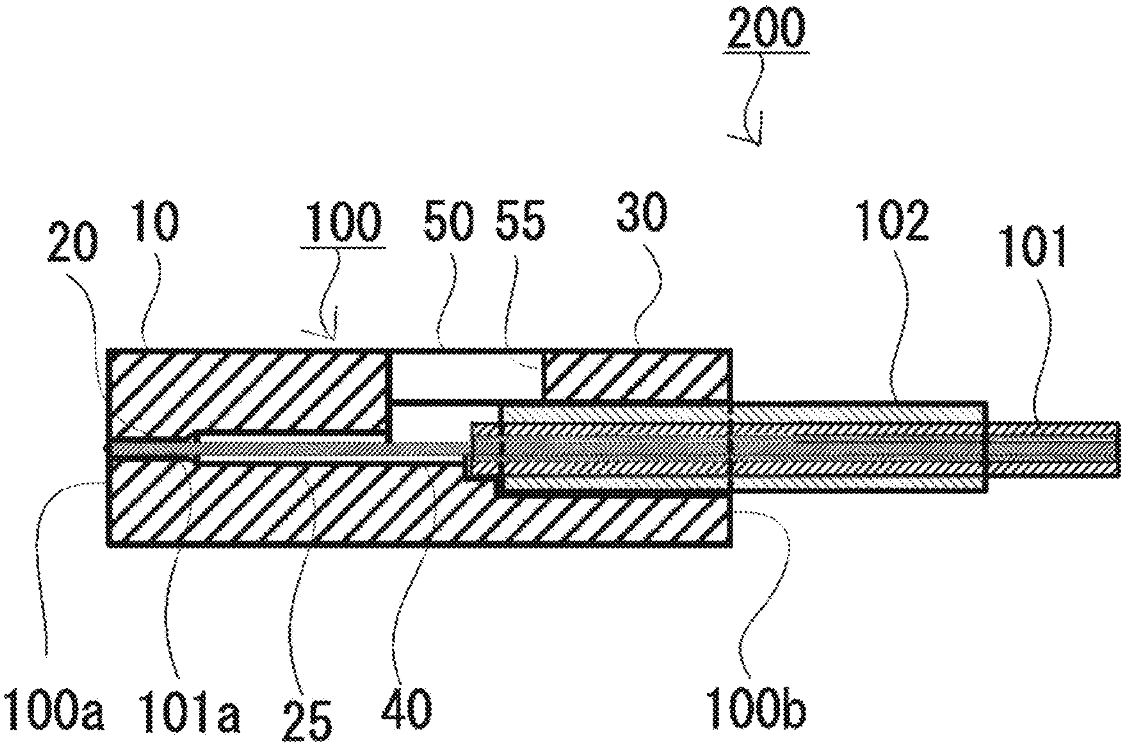

[Fig6]
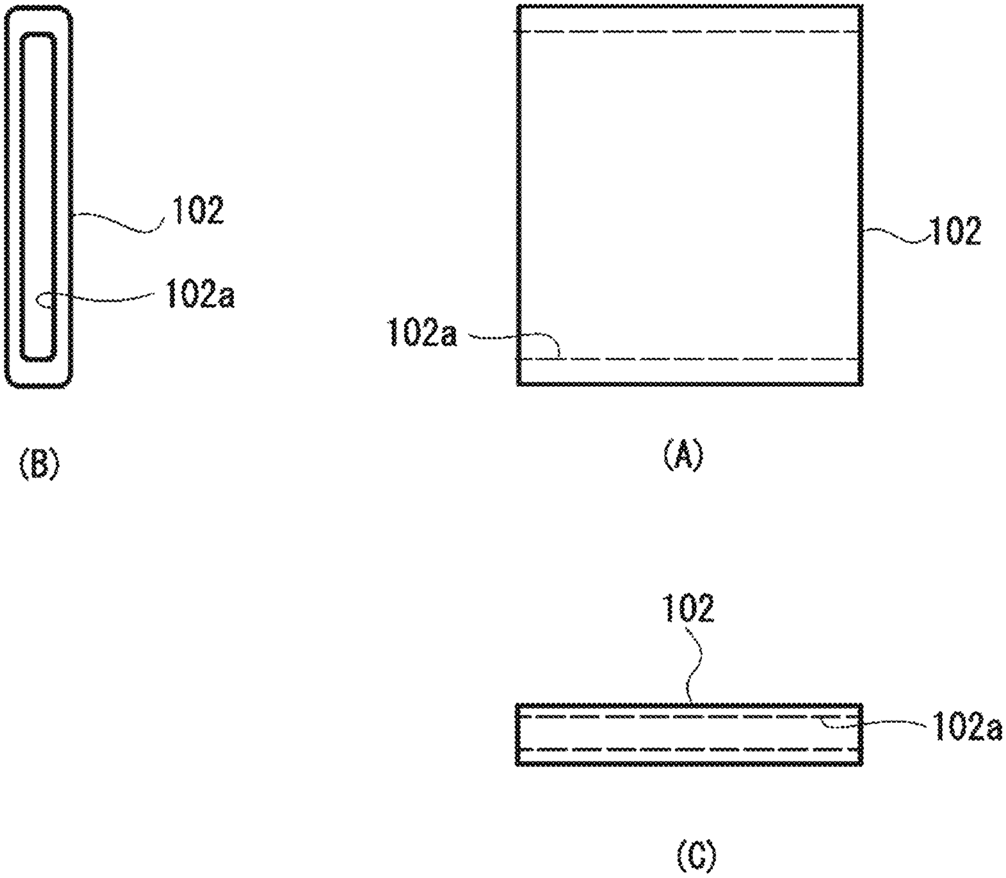

[Fig7]
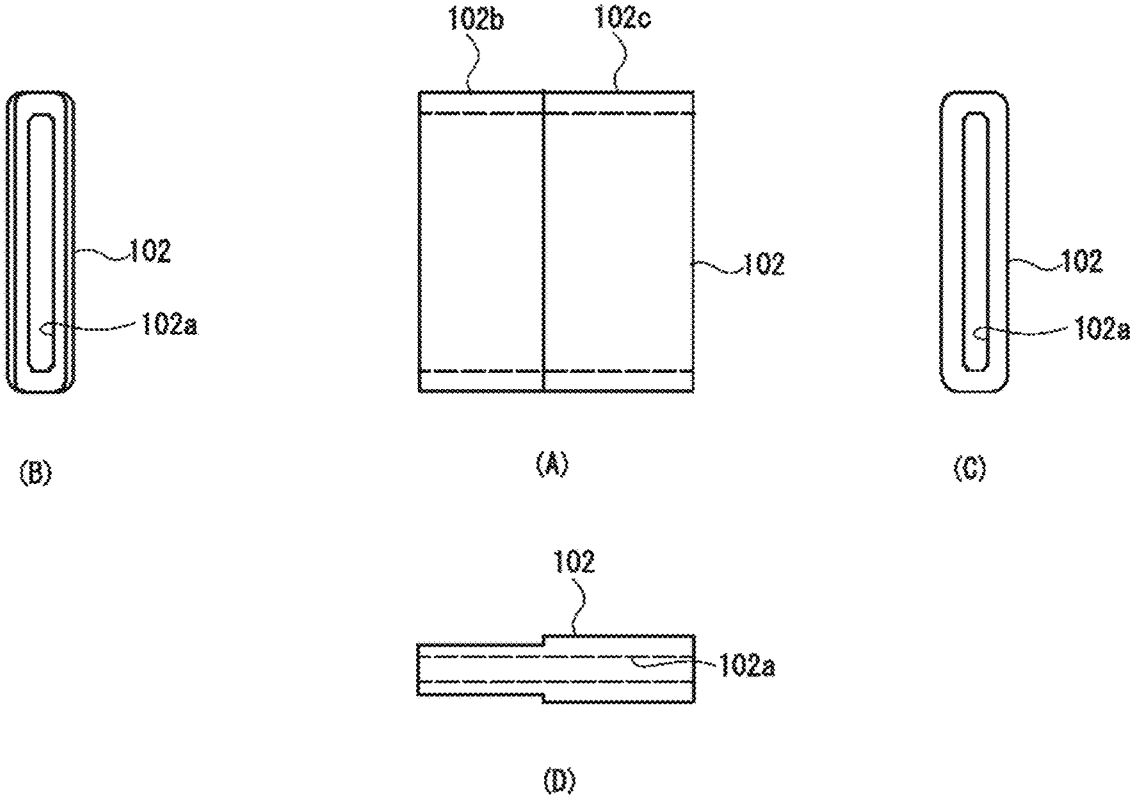

[Fig8]
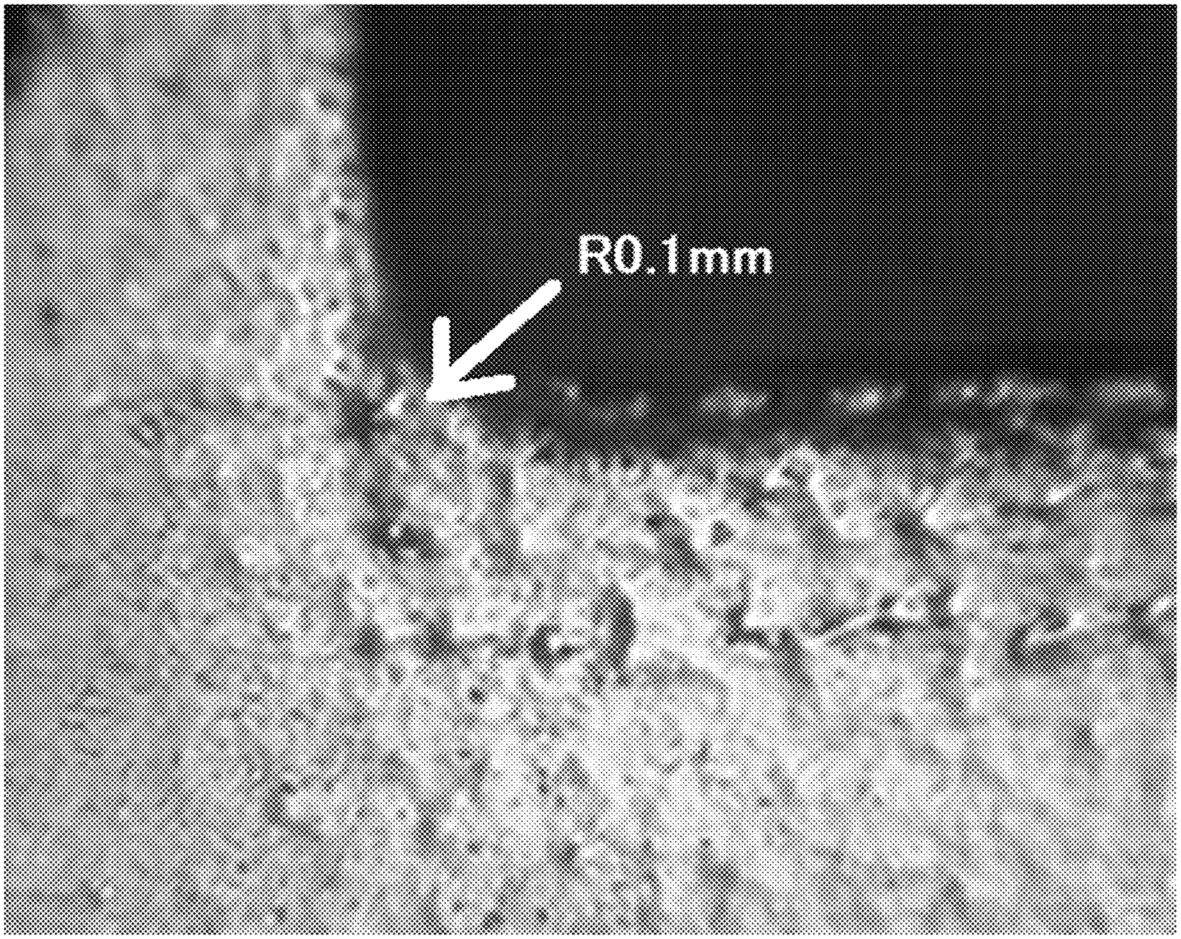

[Fig9]
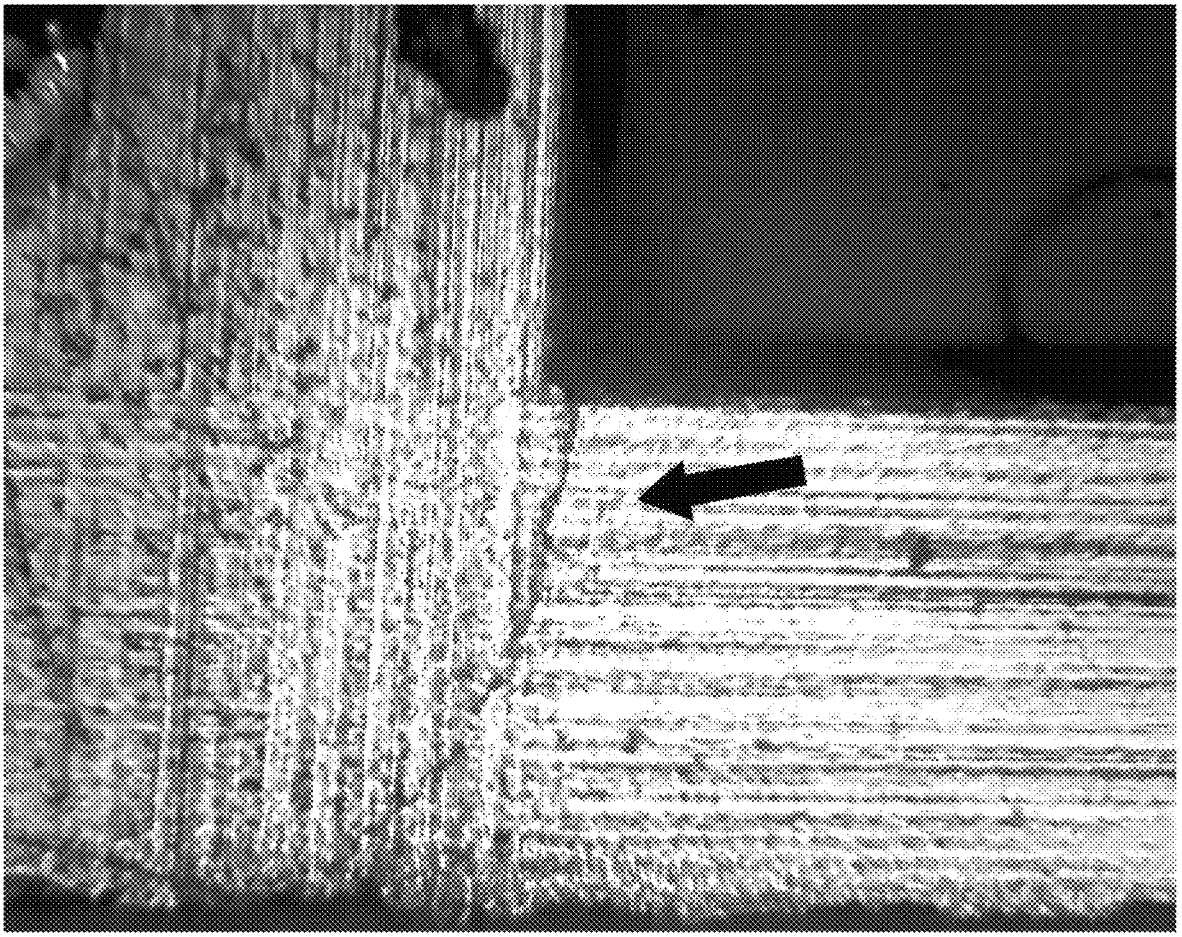

[Fig10]
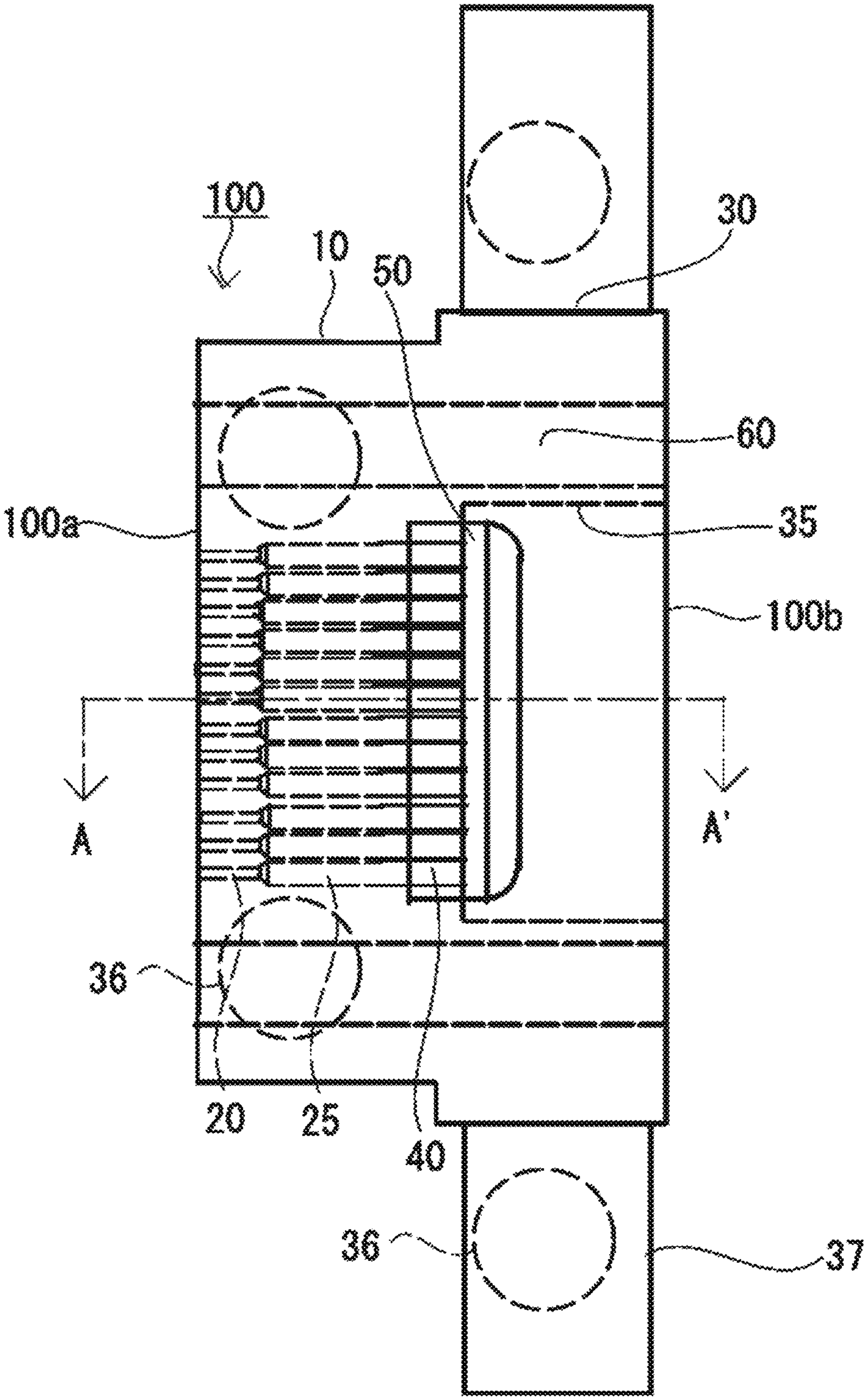

FERRULE, OPTICAL CONNECTOR, AND METHOD FOR MANUFACTURING FERRULE

TECHNICAL FIELD

The present invention relates to an optical connector including a ferrule that optically connects optical fibers of optical cables that transmit an optical signal to each other and a ferrule boot that holds the optical fibers and is inserted into and fixed to the ferrule, and a method for manufacturing the ferrule.

BACKGROUND ART

An optical cable using an optical fiber is able to perform high-speed communication of a large amount of information and hence is widely used in information communication for household use and industrial use.

For example, Patent Literature 1 (Japanese Patent Laid-Open No. 2004-020962) discloses an optical connector in which resin for adhesion can be caused to evenly flow into an optical fiber tape insertion hole of a ferrule of the optical connector without generating air bubbles when an optical fiber tape is fixed to the ferrule.

The optical connector according to Patent Literature 1 includes: a cylindrical boot for protecting an optical fiber tape formed by covering a plurality of optical fibers; and a ferrule having: a boot insertion-attachment hole to which the boot is attached; an optical fiber tape insertion hole provided in communication with the boot insertion-attachment hole; and a plurality of optical fiber holes for the plurality of optical fibers provided in communication with the optical fiber tape insertion hole. The optical connector is formed by being filled with adhesion resin from a window hole provided above the optical fiber tape insertion hole in a state in which the plurality of optical fibers are inserted into the optical fiber holes and the boot to which the optical fiber tape is insertion-attached is inserted into a boot insertion hole, and an inclined part is provided in an optical fiber tape housing part of the fiber tape insertion hole.

Patent Literature 2 (Japanese Patent Laid-Open No. 2007-279576) discloses an optical connector capable of relieving a bending force of an optical fiber by a boot having sufficient flexibly while preventing leaking-out of an adhesive and a manufacturing method capable of easily manufacturing the optical connector.

The optical connector according to Patent Literature 2 is an optical connector in which the optical fiber is inserted through a fiber insertion hole of a ferrule and is fixed by an adhesive, characterized in including a resin material part having an elastic force in a state of being injected to the rear end side of the ferrule in a liquid state and solidified.

Patent Literature 3 (Japanese Patent Laid-Open No. 2001-108867) discloses an MT optical connector ferrule with high accuracy and form stability.

The ferrule according to Patent Literature 3 is a mating-pin-alignment ferrule for a multifiber optical connector made of plastic in which guide pin holes are formed on both of left and right sides of a plurality of optical fiber holes arranged side by side, characterized in that an intermediate portion between the left and right guide pin holes is caused to be thin in a vertically symmetrical manner.

Patent Literature 4 (Japanese Patent Laid-Open No. 2001-264585) discloses an optical connector ferrule of which ease of assembly to be improved.

The optical connector ferrule according to Patent Literature 4 is an optical connector ferrule having a guide hole into which a guide pin is inserted, and an optical fiber insertion part extending from an optical connection port formed on the front end surface side toward the inside, characterized in that: a projecting part is formed on the front end surface side in correspondence to the number of the optical connection ports; and the optical connection port is disposed on a top part of the projecting part.

Patent Literature 5 (Japanese Utility Model Registration No. 3222482) discloses a ferrule and an optical connector capable of eliminating the generation of a crack and chippage damage due to a crack in a boot insertion part into which a ferrule boot is inserted.

The ferrule according to Patent Literature 5 is a ferrule in which a plurality of fiber holes for inserting a plurality of optical fibers are provided in a front end surface, and a boot insertion part to which a ferrule boot through which a plurality of optical fibers are inserted is attached is provided on a rear end part, characterized in that: the boot insertion part is configured to be opened in a part of a rear end surface and an upper surface of the ferrule in a communicating manner; and a boot holding part that holds the ferrule boot is provided on each of both side surfaces of the opening in the width direction.

CITATION LIST

Patent Literature

Patent Literature 1: Japanese Patent Laid-Open No. 2004-020962

Patent Literature 2: Japanese Patent Laid-Open No. 2007-279576

Patent Literature 3: Japanese Patent Laid-Open No. 2001-108867

Patent Literature 4: Japanese Patent Laid-Open No. 2001-264585

Patent Literature 5: Japanese Utility Model Registration No. 3222482

SUMMARY OF INVENTION

Technical Problem

Hitherto, an optical cable has been a cable for connecting information communication devices spaced apart from each other. However, in accordance with an increase in speed and density of the information communication devices, cases where optical cables are used in internal wiring of the information communication devices are recently increasing. In those cases, an optical connector that connects the optical cables to each other is increasingly disposed on an end part of a PC board or on the PC board of an information communication device, and there is a need for causing the optical connector or a ferrule constituting the optical connector to be thinner.

However, the optical fiber in the optical cable is weak against bending. When the optical fiber is bent at a steep angle, the transmission loss of the light increases, and the optical fiber may be destroyed. Therefore, the optical connector includes a boot formed of rubber or resin having flexibly and elasticity on the rear end side to which the optical cable is connected, and prevents the transmission loss of the light from increasing and the optical fiber from being destroyed by causing the optical cable to be inserted through the boot.

In this case, in the portion of the rear end of the optical connector including the boot, the optical cable needs to be inserted through the boot, and the boot through which the optical cable is inserted further needs to be inserted into the ferrule. Therefore, the height of the ferrule becomes inevitably high in the boot insertion part of the ferrule, and it has been difficult to realize a thin ferrule.

In the optical connector according to Patent Literature 1 described above, the ferrule in the portion of the boot insertion hole has a rim shape. As a result, the height of the ferrule becomes high at the boot insertion hole (see FIG. 1 and FIG. 6). As a result of the ferrule in the portion of the boot insertion hole including the rim shape, the wall thickness of the ferrule at the portion of the boot insertion hole is caused to be thick, and the generation of a crack and chippage damage due to the crack in the ferrule at this portion is prevented.

There are no problems when the optical connector including the ferrule having a rim shape is used for connection of optical cables for connecting information communication devices spaced apart from each other. However, when the optical connector is disposed on an end part of a PC board or on the PC board of the information communication device, the optical connector may become an obstacle when increasing the density of the information device.

Even in the case of the ferrule having a rim shape, a portion in which the wall thickness of the ferrule is thin is present between a rim portion and an adhesive filling window, and there is a possibility that a crack may be generated and chippage damage due to the crack may occur.

The ferrule in the portion of a filling region (equivalent to the boot insertion hole) of the resin material in Patent Literature 2 (see FIG. 4), the rim part in Patent Literature 3 (see FIG. 1), and the ferrule in the portion of the boot insertion hole in Patent Literature 3 (see FIG. 4) all have a rim shape. Therefore, it is advantageous in terms of preventing the generation of a crack and chippage damage due to the crack in the ferrule at this portion, but it may become an obstacle when increasing the density of the information device.

Meanwhile, in the ferrule of Patent Literature 5, the boot insertion part has an upper surface that is opened, and the boot is held in the boot insertion part by forming the boot holding part formed by a pair of projecting parts on both side surfaces of the opening in the width direction.

When the ferrule is caused to be thinner and the rim shape of the boot insertion part is removed, the ferrule structure tends to be thinner and the strength tends to decrease, and there has been a problem in that a crack is particularly easily generated between the boot insertion part (boot window) and the adhesive filling part of the ferrule and chippage damage due to the crack occurs when the ferrule boot is inserted.

Meanwhile, in the ferrule in Patent Literature 5, by opening the upper surface of the boot insertion part, the generation of a crack and chippage damage due to the crack in the boot insertion part can be eliminated when the ferrule boot is inserted.

However, the boot is formed of rubber or resin having flexibly and elasticity such that the optical fiber is not bent at a steep angle. Therefore, even when side surfaces of the boot are held by the boot holding part, there have been cases where the boot deforms and the boot holding part cannot sufficiently perform the holding when a force is applied to the optical fiber cable.

An object of the present invention is to provide a thin ferrule which is capable of corresponding to the increase in density of an information device and in which a crack is not generated when a ferrule boot is inserted in a step of manufacturing the ferrule, and to provide a method for manufacturing the ferrule.

Another object of the present invention is to provide an optical connector including a ferrule which is thin and in which a crack is not generated, and a ferrule boot through which a plurality of optical fibers are insertable, which is capable of protecting the optical fibers from bending at a steep angle, and which is insertable into the ferrule which is thin and in which a crack is not generated.

Solution to Problem (1)

A ferrule according to one aspect is a ferrule in which a plurality of fiber holes into which a plurality of optical fibers are inserted are provided in a front end surface, and a boot insertion hole of a boot insertion part into which a ferrule boot through which the plurality of optical fibers are inserted is inserted is provided in a rear end surface, the ferrule including: an internal space that causes the plurality of fiber holes and the boot insertion hole to communicate with each other; and an adhesive fill window of an adhesive filling part for filling the internal space with adhesive on one surface out of the one surface and another surface opposite to each other in an up-down direction, wherein a width of the ferrule at the boot insertion part is greater than a width of a ferrule body; a ratio of a width to a height of the ferrule at the boot insertion part is 5 times or more; and a wall thickness of the ferrule on a periphery of the boot insertion hole is 0.32 mm or more at a thinnest portion.

Here, the direction that connects the front end surface and the rear end surface to each other is the length direction, the direction orthogonal to the length direction is the width direction, and the direction orthogonal to the length direction and the width direction is the up-down direction.

It is preferred that a wall thickness of the ferrule in a periphery of the boot insertion hole be 0.32 mm or more and 0.40 mm or less at a thinnest portion.

In the case of the ferrule including a rim part on the rear end surface of the ferrule, the height of the ferrule at the boot insertion part is equivalent to the height of the ferrule other than the rim part, and the portion of the ferrule at which the wall thickness is the thinnest is equivalent to a thin wall portion between the rim part and the adhesive filling window. The internal space is equivalent to a portion obtained by combining the adhesive filling window and the boot insertion hole in top view.

In optical communication in recent years, many multifiber ferrules that are small in size and enable an increase in density are used. In this case, in order to further cause the size to be smaller and density to be higher, it is preferred that the internal space of the ferrule be able to store a high-density multifiber therein and the external dimension of the ferrule be as small and flat as possible. However, in the case of a thin ferrule in which the ratio of the width to the height of the ferrule at the boot insertion part is 5 times or more, the wall thickness of the ferrule needs to be as thin as possible and the height of the boot insertion hole needs to be secured in order to insert the ferrule boot into the boot insertion part. However, when the wall thickness of the ferrule is caused to be thin, there are problems in that:

1) a crack is generated at the time of ultrasonic cleaning after resin molding; and
2) the ferrule breaks when the ferrule is held by fingers when the ferrule boot through which the fibers are inserted is inserted, for example.

In the ferrule according to one aspect, the generation of a crack can be suitably prevented by causing the wall thickness of the ferrule to be 0.32 mm or more at the portion at which the wall thickness is the thinnest even for a ferrule that is small in size and high in density.

(2)

The ferrule according to the second invention is the ferrule according to one aspect, wherein the ferrule is formed of PPS resin; and a height of the ferrule is 1.24 mm or more and 1.40 mm or less, and a height of the boot insertion hole of the boot insertion part is 0.50 mm or more and 0.70 mm or less.

An extremely high accuracy of position and dimension is required for the multifiber ferrule that is small in size and high in density, and hence it is preferred to use polyphenylene sulfide (PPS) resin. In this case, the thinning of the ferrule and the physical strength of the boot insertion part are conflicting problems, and the selection of the optimal height of the ferrule and the optimal height of the boot insertion hole of the ferrule is important.

In other words, in the thin ferrule that is made of PPS and has a height of 1.24 mm or more and 1.4 mm or less, it is preferred that the height of the boot insertion hole be 0.50 mm or more and 0.70 mm or less in order to cause the wall thickness to be 0.32 mm or more.

When the height of the boot insertion hole is less than a lower limit value, the height of the boot to be inserted into the boot insertion hole becomes too low, and it becomes difficult to manufacture a boot through which the optical fibers can be smoothly inserted. When the height of the boot insertion hole exceeds an upper limit value, it becomes difficult to secure the wall thickness of the ferrule, and troubles may occur.

(3)

The ferrule according to a third invention is the ferrule according to one aspect to the second invention, wherein an ejection pin trace of the ferrule may be positioned in a portion that does not overlap with the internal space in top view and on a side of another surface faced in the up-down direction.

The ferrule is formed by molding the resin material filled with the inorganic filler, for example. However, when the ejection pin is provided in a position equivalent to the internal space of the ferrule in top view at the time of resin molding, there is a possibility that a crack is formed in the ferrule at the time of ejection because the ferrule in the portion equivalent to the internal space has a thin wall thickness. Even when an apparent crack is not formed in the ferrule in terms of external appearance, an internal crack may be formed on the inside of the ferrule. As a result, the durability of the ferrule may decrease.

In the ferrule according to the third invention, the generation of a crack at the time of ejection is prevented by disposing the ejection pin in a portion that does not overlap with the internal space in top view on the side of the other surface (the side of the other surface opposite from the adhesive filling window) in the up-down direction.

(4)

The ferrule according to a fourth invention is the ferrule according to one aspect to the third invention, wherein a round shape with a radius of 0.3 mm or more may be provided in a corner of the adhesive filling window on the rear end surface side thereof.

When the ferrule is pressed by fingers, or when ultrasonic cleaning of the ferrule is performed, a crack is easily formed in the corner of the adhesive filling window on the rear end surface side thereof. In the ferrule according to the fourth invention, by providing the round shape with the radius of 0.3 mm in the corner of the adhesive filling window on the rear end surface side thereof, the concentration of stress is avoided and the generation of a crack in this portion is prevented.

(5)

The ferrule according to a fifth invention is the ferrule according to one aspect to the fourth invention, wherein a round shape with a radius of 0.1 mm or more may be provided in each of four corners of the boot insertion hole.

A crack is easily formed in the four corners of the boot insertion hole at the time of ultrasonic cleaning, at the time of ferrule boot insertion, and the like.

In the ferrule according to the fifth invention, by providing the round shape with the radius of 0.1 mm in each of the four corners of the boot insertion hole, the generation of a crack is prevented in this portion.

(6)

An optical connector according to another aspect includes: the ferrule according to one aspect to the fifth invention; and the ferrule boot that holds the plurality of optical fibers disposed in the ferrule and that is inserted into and fixed to the boot insertion part of the ferrule, wherein the ferrule boot is formed of ABS resin.

The ferrule boot of the related art is formed of synthetic resin such as rubber and elastomer having flexibly and elasticity. This is because the ferrule boot is disposed on the outer periphery of the optical fiber cable and is for preventing inconveniences such as an increase in the transmission loss of light from occurring due to a load in the bending direction being applied to the optical fiber cable and causing bending at a steep angle or the optical fibers being destroyed by insertion and removal operation of the connector, repeated bending of the optical fiber cable, and the like.

However, in the thin ferrule that is small in size such as that in the present invention, the height of the boot insertion hole is low, and hence the height of the boot is also low. Meanwhile, the optical fiber needs to be inserted through the boot, and hence the fiber insertion hole needs to be provided on the inside of the boot. Therefore, the wall thickness of the ferrule boot becomes thin.

In this case, it is difficult to mold a thin boot with rubber, elastomer, and the like of the related art. Even when a thin boot with a low height can be molded, a problem in which wall surfaces constituting the insertion hole adhere to each other and the optical fiber tape cannot be inserted into the insertion hole may occur because the optical fiber insertion hole for inserting the optical fiber tape is formed in the boot.

In the optical connector according to the other aspect, ABS resin is employed as a material having flexibly necessary for protecting the optical fiber and rigidity necessary for forming the thin boot.

The ABS resin has a tensile breaking strength of 40 MPa to 50 MPa and a bending elastic modulus of 2000 MPa to 2500 MPa, and has both of the rigidity and the flexibly necessary as the material of the boot.

As a result, a small and thin boot can be reliably molded, and troubles of the optical fiber tape due to adhesion of the insertion hole can be prevented.

(7)

The optical connector according to the seventh invention is the optical connector according to the other aspect, wherein the ferrule boot may include an optical fiber insertion hole through which the plurality of optical fibers are inserted; and a wall thickness of the ferrule boot on a periphery of the optical fiber insertion hole may be 0.15 mm or more at a thinnest portion.

In this case, the height of the light insertion hole in the ferrule boot can be caused to be 0.3 mm by causing the wall thickness to be 0.15 mm. The ferrule boot with a wall thickness of 0.15 mm can be stably molded by using the ABS resin.

(8)

A method for manufacturing a ferrule according to yet another aspect is a method for manufacturing the ferrule according to one aspect to the fifth invention including: a resin molding step of molding a ferrule semi-finished product including gates that each protrudes from each of both width-direction ends of the boot insertion part of the ferrule; an ejecting step of ejecting the ferrule semi-finished product by providing an ejection pin position in the gate on a side of another surface of the gate and in a portion of the ferrule body that does not overlap with the internal space in top view on the side of the other surface of the portion; and a cutting off step of cutting off the gate from the ferrule semi-finished product.

In order to prevent the generation of a crack at the time of ejection, the ejection pin needs to be positioned in a portion that does not overlap with the internal space in top view. However, the area of the portion that does not overlap with the internal space is small on the boot insertion part side of the ferrule, and hence it is difficult to position the ejection pin in a portion that does not overlap with the internal space.

Therefore, in the method for manufacturing the ferrule according to another aspect, the ejecting step in which ejection is smoothly performed and a crack is not generated at the time of ejection is realized by positioning the ejection pins in portions that do not overlap with the internal space in top view (the adhesive filling window and the boot insertion hole in top view) on the side of the other surface of the gates protruding from the width-direction both ends of the boot insertion part and the side of the other surface of the ferrule body.

BRIEF DESCRIPTION OF DRAWINGS

FIG. 1 is a schematic perspective view of a ferrule of a first embodiment.

FIG. 2(A) is a schematic top view of the ferrule of the first embodiment, FIG. 2(B) is a schematic side view seen from the left side, FIG. 2(C) is a schematic side view seen from the right side, and FIG. 2(D) is a schematic cross-sectional view of FIG. 2(A) taken along a surface A-A'.

FIG. 3(A) is a schematic top view of a ferrule of a modified example, FIG. 3(B) is a schematic side view seen from the left side, and FIG. 3(C) is a schematic side view seen from the right side.

FIG. 4 is a schematic exploded perspective view showing the configuration of an optical connector of the first embodiment.

FIG. 5 is a schematic cross-sectional view of the optical connector taken along a surface equivalent to the surface A-A' in FIG. 2(A).

FIG. 6(A) is a schematic top view of the ferrule boot of the first embodiment, FIG. 6(B) is a schematic side view seen from the left side, and FIG. 6(C) is a schematic side view seen from the near side.

FIG. 7(A) is a schematic top view of a ferrule boot of the modified example, FIG. 7(B) is a schematic side view seen from the left side, FIG. 7(C) is a schematic side view seen from the right side, and FIG. 7(D) is a schematic side view seen from the near side.

FIG. 8 is a photograph of a ferrule of an example taken from the rear end side.

FIG. 9 is a photograph of a ferrule of a comparative example taken from the rear end side.

FIG. 10 is a schematic view showing positions of ejection pins in a top view of a ferrule semi-finished product in which gates are remaining.

DESCRIPTION OF EMBODIMENTS

Hereinafter, embodiments of the present invention will be described with reference to the drawings.

In the description below, the same reference characters are applied to the same parts. The same applies to names and functions thereof. Therefore, detailed description thereof is not repeated.

First Embodiment

Ferrule 100

FIG. 1 is a schematic perspective view showing a ferrule 100 of a first embodiment. FIG. 2(A) is a schematic top view of the ferrule 100 of the first embodiment, FIG. 2(B) is a schematic side view seen from the left side, FIG. 2(C) is a schematic side view seen from the right side, and FIG. 2(D) is a schematic cross-sectional view of FIG. 2(A) taken along a surface A-A'.

As shown in FIG. 1 to FIG. 2, the ferrule 100 of this embodiment includes: a ferrule body 10; a plurality of optical fiber holes 20 that each has a distal end (connection end surface) opened to a front end surface 100*a* of the ferrule 100 and that are for inserting, positioning, and fixing a portion of optical fibers of which coating is removed; a plurality of fiber guidance holes 25 that each communicates with a rear end of each of the plurality of optical fiber holes 20 and are parallel to each other; a plurality of U-shaped or V-shaped fiber guidance grooves 40 that each communicates with a rear end of each of the plurality of the fiber guidance holes 25 and are parallel to each other; a boot insertion part 30 which is provided on the rear end side of the ferrule body 10 and to which the ferrule boot through which the optical fibers are inserted is attached; an adhesive filling part 50 to which adhesive for fixing the optical fibers to the ferrule body 10 is injected; and two guide pin holes 60 that are formed in the vicinity of both end parts in the horizon width direction to be parallel to the plurality of optical fiber holes 20 and are for inserting guide pins.

The boot insertion part 30 has a boot insertion hole 35 opened in a rear end surface 100*b* of the ferrule 100, and the adhesive filling part 50 has an adhesive filling window 55 opened in an upper surface of the ferrule body 10. In the ferrule 100, an internal space for communicating the optical fiber holes 20 and the fiber guidance holes 25 with the boot insertion hole 35 is provided. Ejection pin traces 36*a* in FIG. 2 are traces generated when the ferrule 100 is ejected from the mold in a process of manufacturing the ferrule 100. The ejection pin traces 36*a* may be traces that can be visually checked in terms of external appearance or may be traces that can be grasped from the internal structure (density and the like) of a resin.

In the description of the present specification, the direction (the left-right direction in FIG. 2(A)) that connects the front end surface 100*a* and the rear end surface 100*b* to each other is the length direction, the direction orthogonal to the length direction (the up-down direction in FIG. 2(A)) is the width direction, and the direction orthogonal to the length direction and the width direction is the up-down direction.

As can be understood from FIG. 1 and FIG. 2, regarding the width of the ferrule 100, the boot insertion part 30 is greater than the ferrule body 10 in which the plurality of optical fiber holes 20 and the fiber guidance holes 25 are provided. This is because the boot insertion hole 35 into which a ferrule boot 102 (see FIG. 3) is inserted is opened in the boot insertion part 30, and stress is applied to the boot insertion part 30 at the time of insertion of the ferrule boot 102, for example.

As the ferrules 100 of the related art, there are many ferrules 100 having a so-called rim shape in which the wall thickness of the ferrule 100 is also thickened in the up-down direction of the boot insertion part 30 in order to enhance the physical strength of the boot insertion part 30. Including a rim shape is effective as measures against stress at the time of insertion of the ferrule boot 102. However, the wall thickness of the ferrule 100 is thin in the vicinity of the adhesive filling window 55 also in the case of the ferrule 100 having the rim shape. Thus, there are many cases where a crack is formed in this portion at the time of ultrasonic cleaning after resin molding and the like, and hence it is not sufficient as measures against crack generation.

The ferrule 100 is increasingly caused to be a thin multifiber ferrule in order to correspond to the increase in density of information devices. The ferrule 100 of this embodiment is a twelve-fiber ferrule, and has a maximum width of 7.00 mm and a height of 1.25 mm. Therefore, the proportion of the width to the height is 5.6 times.

The ferrule 100 having such a shape is configured by molding a resin material filled with an inorganic filler, for example. The resin material is a thermosetting epoxy resin, a polyphenylene sulfide (PPS), and the like. Out of the above, it is preferred to use polyphenylene sulfide (PPS) resin from the viewpoint of positional accuracy, dimensional accuracy, molding shrinkage rate, and thermal stability. As a result, a ferrule that is small in size and has low connection loss even when high-density mounting is performed can be obtained. Spherical silica, for example, can be used for the inorganic filler.

The strength of the ferrule can be improved by performing filling with the inorganic filler. However, in the thin ferrule 100 in which the ratio of the width to the height is 5 times or more, the wall thickness of the ferrule 100 on the periphery of the boot insertion hole 35 is thin, and a crack is easily formed in this portion.

A corner part of an opening out of the portion in which the wall thickness of the ferrule 100 is thin is especially a place in which stress is concentrated and a crack is easily formed. Thus, a round shape with a radius of 0.3 mm is provided in each corner of the adhesive filling window 55 on the rear end surface 100*b* side thereof, and a round shape with a radius of 0.1 mm is also provided in each of four corners of the boot insertion hole 35. As a result, wall thickness can be secured, and stress can be effectively dispersed. In this embodiment, the portion at which the wall thickness is the thinnest is the periphery of the opening of the boot insertion hole 35 and/or the periphery of the opening of the adhesive filling window 55, and a crack is particularly easily generated near the four corners of the opening.

Modified Example of Ferrule 100

FIG. 3(A) is a schematic top view of the ferrule 100 of a modified example, FIG. 3(B) is a schematic side view seen from the left side, and FIG. 3(C) is a schematic side view seen from the right side.

The ferrule 100 in FIG. 2 is a so-called Slim & Short ferrule of which height is 1.25 mm and length is 4 mm, but the ferrule 100 in FIG. 3 is a Slim ferrule of which height is 1.25 mm and length is 8 mm. The ferrule in FIG. 2 is a twelve-fiber ferrule, but the ferrule in FIG. 3 is a sixteen-fiber ferrule. The present invention is also applicable to a sixteen-fiber Slim & Short ferrule or a twelve-fiber Slim ferrule other than the above.

(Optical Connector 200)

FIG. 4 is a schematic exploded perspective view of a case where an optical fiber cable 101 is inserted into an optical connector 200 configured by the ferrule 100 and the ferrule boot 102, and FIG. 5 is a schematic cross-sectional view of a case where the optical connector 200 in which the optical fiber cable 101 is inserted is taken along a surface equivalent to a surface A-A' in FIG. 2(A). The optical fiber cable 101 is inserted through the ferrule boot 102, and the ferrule boot 102 is inserted into and fixed to the boot insertion part 30 of the ferrule 100. In the internal space of the ferrule 100, the optical fiber cable 101 becomes bare fibers 101*a* at a position beyond the distal end side of the ferrule boot 102, and reaches the front end surface 100*a* of the ferrule 100 via the fiber guidance grooves 40, the fiber guidance holes 25, and the optical fiber holes 20.

(Ferrule Boot 102)

FIG. 6(A) is a schematic top view of the ferrule boot 102, FIG. 6(B) is a schematic side view seen from the left side, and FIG. 6(C) is a schematic side view seen from the near side. In the ferrule boot 102, an optical fiber insertion hole 102*a* for inserting the optical fiber cable 101 is opened. The height of the optical fiber insertion hole 102*a* is equivalent to the height of the optical fiber cable 101 and is about 0.3 mm.

The wall thickness of the ferrule boot 102 depends on the height of the ferrule boot 102, and the height of the ferrule boot 102 is substantially equal to the height of the boot insertion hole. For example, the wall thickness of the ferrule boot 102 is 0.25 mm when the height of the boot insertion hole 35 is 0.80 mm, and the wall thickness of the ferrule boot 102 is 0.15 mm when the height of the boot insertion hole 35 is 0.60 mm. When the height of the boot insertion hole becomes lower, the wall thickness of the ferrule boot 102 naturally becomes thinner, and the molding of the ferrule boot 102 becomes more difficult.

As the opening width of the optical fiber insertion hole 102*a* becomes greater and the opening height thereof becomes lower, wall surfaces constituting the optical fiber insertion hole 102*a* adhere to each other more easily. Therefore, even when the molding of the ferrule boot 102 has been able to be performed, a problem may occur in that walls of the optical fiber insertion hole 102*a* adhere to each other as time passes and the optical fiber tape cannot be inserted.

The ferrule boot 102 of the related art is formed of synthetic resin such as rubber and elastomer having flexibly and elasticity. This is because the ferrule boot 102 is disposed on an outer periphery of the optical fiber cable 101 and is for preventing inconveniences such as an increase in the transmission loss of light from occurring due to a load in the bending direction being applied to the optical fiber cable 101 and causing bending at a steep angle or the optical fiber cable 101 being destroyed by insertion and removal operation of the optical connector 200, repeated bending of the optical fiber cable 101, and the like.

However, in the thin ferrule 100 such as that in the present invention, the height of the boot insertion hole 35 is low, and hence the height of the ferrule boot 102 is also low. Meanwhile, the optical fiber cable 101 needs to be inserted through the ferrule boot 102, and hence the optical fiber insertion hole 102*a* needs to be provided on the inside of the ferrule boot 102. Therefore, the wall thickness of the ferrule boot 102 becomes thin. In this case, it is difficult to form a thin boot with rubber, elastomer, and the like of the related art.

In this embodiment, ABS resin is employed as a material having flexibly necessary for protecting the optical fibers and rigidity necessary for forming the thin ferrule boot 102.

The ABS resin has a tensile breaking strength of 40 MPa to 50 MPa and a bending elastic modulus of 2000 MPa to 2500 MPa, and has both of the rigidity and the flexibly necessary as the material of the ferrule boot 102. As a result, a small and thin boot can be reliably molded, and troubles of the optical fiber tape due to adhesion of the insertion hole can be prevented.

FIG. 7 shows a modified example of the ferrule boot 102. FIG. 7(A) is a schematic top view of the ferrule boot 102 of the modified example, FIG. 7(B) is a schematic side view seen from the left side, FIG. 7(C) is a schematic side view seen from the right side, and FIG. 7(D) is a side view seen from the near side. The height of the optical fiber insertion hole 102*a* is about 0.3 mm.

In the ferrule boot 102 in FIG. 7, an insertion part 102*b* to be inserted into the boot insertion hole 35 of the ferrule 100 can be inserted into the boot insertion hole 35 having a wall thickness of 0.15 mm and a height of 0.60 mm. Meanwhile, a protruding part 102*c* protruding from the boot insertion hole 35 of the ferrule 100 has a thick wall thickness, which may be 0.25 mm, for example.

In the modified example of the ferrule boot 102 in FIG. 7, the physical strength of the ferrule boot 102 when the optical fiber cable 101 is bent can be improved by causing the wall thickness of the portion of the protruding part 102*c* to be thicker.

Example and Comparative Example of Ferrule 100

An example and a comparative example of the ferrule 100 are described below.

Example 1

FIG. 8 is a photograph of the ferrule 100 in Example 1 seen from the rear end side. The ferrule 100 in FIG. 8 was obtained by performing injection molding of PPS resin and was a thin ferrule in which the width of the boot insertion part 30 was 7.0 mm, the width of the ferrule body 10 was 6.40 mm, the height of the ferrule body 10 was 1.25 mm, and the ratio of the width to the height was 5.6 times at the boot insertion part 30 and was 5.12 times at the ferrule body 10. The wall thickness of the ferrule 100 on the periphery of the boot insertion hole 35 was 0.325 mm, the height of the boot insertion hole 35 was 0.60 mm, and the width was 3.60 mm.

A round shape with a radius of 0.1 mm was provided in each of the four corners of the boot insertion hole 35. Although it cannot be confirmed from FIG. 8, a round shape with a radius of 0.3 mm was provided in each corner of the adhesive filling window 55 on the rear end surface 100*b* side in the ferrule 100 in Example 1.

As can be understood from FIG. 8, in the ferrule 100 in Example 1, no cracks were observed even in the four corners of the boot insertion hole 35 in which a crack is easily generated. Cracks are generated in ultrasonic cleaning in many cases. However, in the ferrule 100 in Example 1, there were no ferrules in which a crack was generated even when ultrasonic cleaning was performed on a parameter of 300 ferrules 100 in a state in which ultrasonic output was 100%.

Comparative Example 1

FIG. 9 is a photograph of the ferrule 100 in Comparative Example 1 seen from the rear end side. The ferrule 100 in FIG. 9 was molded as with the ferrule 100 in Example 1 and was a thin ferrule in which the width of the boot insertion part 30 was 7 mm, the width of the ferrule body 10 was 6.4 mm and the height of the ferrule body 10 was 1.25 mm, and the ratio of the width to the height was 5.6 times at the boot insertion part 30 and was 5.12 times at the ferrule body 10. However, the height of the boot insertion hole 35 was 0.8 mm and was high, and hence the wall thickness of the ferrule 100 on the periphery of the boot insertion hole 35 was 0.225 mm and was thin. The width of the boot insertion hole 35 was 3.6 mm.

Round shapes were not provided in neither the four corners of the boot insertion hole 35 nor the corners of the adhesive filling window 55 on the rear end surface 100*b* side thereof.

As can be understood from FIG. 9, in the ferrule 100 of Comparative Example 1, a crack was formed (arrow) in the corner of the boot insertion hole 35, and there is a high possibility that a chippage damage due to the crack occurs during usage. As with Example 1, for the ferrule 100 of Comparative Example 1, ultrasonic cleaning was performed on a parameter of 300. However, in the ferrule 100 of Comparative Example 1, generation of a crack due to the ultrasonic cleaning was expected, and hence ultrasonic cleaning was performed by reducing the output of ultrasonic waves to 50%. Nevertheless, in the ferrule 100 of Comparative Example 1, the generation of a crack was observed in 46% of the ferrules.

When Example 1 and Comparative Example 1 were compared with each other, the example was different in that:

a) the wall thickness of the ferrule 100 on the periphery of the boot insertion hole 35 was thicker by 0.1 mm; and b) round shapes were provided in the four corners of the boot insertion hole 35.

Therefore, the reason a crack was not generated in the ferrule 100 in Example 1 was conceived to be because the wall thickness of the ferrule 100 was 0.1 mm and was thick and/or a round shape was provided in each of the four corners of the boot insertion hole 35.

The inventors of the present invention also performed examination for a case where only the wall thickness of the ferrule 100 was caused to be thick as another comparative example, but a significant improvement was seen regarding the generation of a crack in that case as well. Therefore, it was most effective to cause the wall thickness of the ferrule 100 to be thick. In addition, the concentration of stress to the four corners was able to be prevented, and the crack generation prevention effect was able to be enhanced by providing a round shape in each of the four corners of the boot insertion hole 35.

In the ferrule 100 in Example 1, a round shape with a radius of 0.3 mm or more was provided in each corner of the adhesive filling window 55 on the rear end surface 100*b* side thereof, but the generation of a crack caused when the ferrule is pressed by fingers, for example, was able to be suppressed by providing the round shape here.

From the results above, in a thin ferrule in which the height was 1.25 mm and the ratio of the width to the height of the boot insertion part 30 of the ferrule 100 was 5 times or more, the wall thickness of the ferrule 100 on the periphery of the boot insertion hole 35 needed to be 0.32 mm or more at the thinnest portion. It was also desired to provide a round shape with a radius of 0.1 mm or more in each of the four corners of the boot insertion hole 35 and to provide a round shape with a radius of 0.3 mm or more in each corner of the adhesive filling window 55 on the rear end surface 100*b* side thereof.

Example and Comparative Examples of Ferrule Boot 102

Example 2

The shape of the ferrule boot 102 in Example 2 was as that described in FIG. 6 or FIG. 7, and the height was 0.6 mm, the wall thickness of the thinnest part was 0.15 mm, and the opening of the optical fiber insertion hole 102*a* was 0.3 mm such that insertion into the boot insertion hole 35 with the height of 0.6 mm is possible.

The ferrule boot 102 in Example 2 was resin-molded by ABS resin of which rigidity was higher. Specifically, Techno ABS 350 of Techno Polymer Co., Ltd. was used as molding resin. Techno ABS 350 was resin of which rigidity was higher than elastomer that has hitherto been used as the resin for the ferrule boot 102. In Techno ABS 350, the bending elastic modulus (ASTM D790) was 2350 MPa, and the tensile breaking strength (ASTM D638) was 41.2 MPa, for example. ASTM is a standard developed by ASTM International that is the world's largest scale standards body.

By using Techno ABS 350 as the molding resin, the ferrule boot 102 in which the wall thickness of the thinnest part was 0.15 mm and the opening was 0.3 mm was able to be stably resin-molded, and the optical fiber cable 101 was also able to be reliably inserted at the time of assembling of the optical connector 200.

Comparative Example 2

Regarding the shape of the ferrule boot 102 in Comparative Example 2, the height was 0.8 mm, the wall thickness of the thinnest part was 0.25 mm, and the opening was 0.3 mm in FIG. 6.

The ferrule boot 102 in Comparative Example 2 was able to be resin-molded with use of elastomer as before. For example, PELPRENE® P90BD (manufactured by TOYOBO CO., LTD) was able to be used as the resin. P90BD had a bending elastic modulus (ASTM D790) of 162 MPa, a tensile breaking strength (ASTM D638) of 31 MPa, and a physical property that is easily bent and slightly easily broken.

The ferrule boot 102 in Comparative Example 2 was able to be stably resin-molded, but the height of the boot insertion hole 35 was 0.6 mm in the ferrule 100 in Example 2, and hence the optical connector 200 was not able to be obtained in combination with the ferrule 100 of the example.

Comparative Example 3

The shape of the ferrule boot 102 in Comparative Example 3 was the same as that of the example. However, as with Comparative Example 2, Comparative Example 3 used PELPRENE® P90BD as the molding resin. However, when resin molding was performed in the same shape as that in the Example 2, the shape after the molding did not become stable, and the optical fiber cable 101 was not able to be reliably inserted.

From the results above, for the boot to be combined with the thin ferrule 100 including the boot insertion hole 35 with a height of 0.6 mm, molding needed to be performed with resin of which wall thickness was 0.15 mm and rigidity was high such as ABS resin.

(Method for Manufacturing Ferrule 100)

FIG. 10 is a schematic view describing ejection pin positions 36 in a top view of a ferrule semi-finished product in which gates 37 are remaining.

The ferrule 100 is manufactured by resin molding. In this case, after resin molding is performed by filling the mold with injected resin via the gates 37, the ferrule semi-finished product that is resin-molded is ejected from the mold by ejection pins, the gates are cut off from the body of the ferrule 100 in the end, and the ferrule 100 is completed.

In the ferrule 100 of the related art, all of the ejection pin positions 36 have been disposed on the body of the ferrule 100. However, in the ferrule 100 of this embodiment, when the ejection pin positions 36 overlap with the internal space that causes the fiber guidance holes 25 and the boot insertion hole 35 to communicate with each other in top view, a crack is formed in the ferrule semi-finished product at the time of ejection because the wall thickness of the ferrule at the portion of the internal space is thin. Meanwhile, as can be understood from FIG. 10, it is particularly difficult to dispose the ejection pin positions 36 on the rear end surface 100*b* side in a portion (the outer side of the boot insertion hole 35 in FIG. 10) that does not overlap with the internal space.

In a method for manufacturing the ferrule 100 of this embodiment, the ejection pin positions 36 on the front end surface 100*a* side are disposed on the side of the other surface of the ferrule body 10, and the ejection pin positions 36 on the rear end surface 100*b* side are not disposed on the boot insertion part 30 and are disposed on the side of the other surfaces of the gates 37 that protrude from each of width-direction both ends of the boot insertion part 30. As a result, the ejection pin positions 36 do not overlap with the internal space in top view, and a crack is prevented from being formed in the ferrule semi-finished product at the time of ejection.

In the ferrule 100 manufactured by this manufacturing method, the ejection pin traces 36*a* do not overlap with the internal space (equivalent to the adhesive filling window and the boot insertion hole) in top view.

In the present invention, the optical fiber holes 20 and the fiber guidance holes 25 are equivalent to a "fiber hole", the front end surface 100*a* is equivalent to a "front end surface", the ferrule boot 102 is equivalent to a "ferrule boot", the boot insertion part 30 is equivalent to a "boot insertion part", the boot insertion hole 35 is equivalent to a "boot insertion hole", the rear end surface 100*b* is equivalent to a "rear end surface", the ferrule 100 is equivalent to a "ferrule", the adhesive filling part 50 is equivalent to an "adhesive filling part", the adhesive filling window 55 is equivalent to an "adhesive filling window", the ferrule body 10 is equivalent to a "ferrule body", the ejection pin traces 36*a* are equivalent to an "ejection pin trace", the optical connector 200 is equivalent to an "optical connector", the optical fiber insertion hole 102*a* is equivalent to an "optical fiber insertion hole", the gate 37 is equivalent to a "gate", and the ejection pin position 36 is equivalent to an "ejection pin position".

One preferable embodiment of the present invention is as described above, but the present invention is not limited to thereto. It can be understood that other various embodiments can be made without departing from the spirit and scope of the present invention. In this embodiment, actions and effects obtained by the configuration of the present invention have been described, but those actions and effects are an example and do not limit the present invention.

REFERENCE SIGNS LIST

10 ferrule body
20 optical fiber hole
25 fiber guidance hole
30 boot insertion part
35 boot insertion hole
36 ejection pin position
36*a* ejection pin trace
37 gate
50 adhesive filling part
55 adhesive filling window
100 ferrule
100*a* front end surface
100*b* rear end surface
102 ferrule boot
102*a* optical fiber insertion hole
200 optical connector

The invention claimed is:

1. A ferrule in which a plurality of fiber holes into which a plurality of optical fibers are inserted are provided in a front end surface, and a boot insertion hole of a boot insertion part into which a ferrule boot through which the plurality of optical fibers are inserted is inserted is provided in a rear end surface, the ferrule comprising:

an internal space that causes the plurality of fiber holes and the boot insertion hole to communicate with each other; and an adhesive filling window for filling the internal space with adhesive on one surface faced in an up-down direction, wherein a width of the ferrule at the boot insertion part is greater than a width of a ferrule body in which the plurality of fiber holes are provided;

a ratio of a width to a height of the ferrule at the boot insertion part is 5 times or more; and a wall thickness of the ferrule on a periphery of the boot insertion hole is 0.32 mm or more at a thinnest portion.

2. The ferrule according to claim 1, wherein the ferrule is formed of PPS resin; and a height of the ferrule at the boot insertion part is 1.24 mm or more and 1.40 mm or less, and a height of the boot insertion hole of the boot insertion part is 0.50 mm or more and 0.70 mm or less.

3. The ferrule according to claim 1, wherein an ejection pin trace of the ferrule is positioned in a portion that does not overlap with the internal space in top view and on a side of another surface faced in the up-down direction.

4. The ferrule according to claim 1, wherein a round shape with a radius of 0.3 mm or more is provided in a corner of the adhesive filling window on a side of the rear end surface.

5. The ferrule according to claim 1, wherein a round shape with a radius of 0.1 mm or more is provided in each of four corners of the boot insertion hole.

6. An optical connector, comprising:

the ferrule according to claim 1; and the ferrule boot that holds the plurality of optical fibers disposed in the ferrule and that is inserted into and fixed to the boot insertion part of the ferrule, wherein the ferrule boot is formed of ABS resin.

7. The optical connector according to claim 6, wherein the ferrule boot includes an optical fiber insertion hole through which the plurality of optical fibers are inserted; and a wall thickness of the ferrule boot on a periphery of the optical fiber insertion hole is 0.15 mm or more at a thinnest portion.

8. A method for manufacturing the ferrule according to claim 1, comprising:

a resin molding step of molding a ferrule semi-finished product including gates that each protrudes from each of both width-direction ends of the boot insertion part of the ferrule;

an ejecting step of ejecting the ferrule semi-finished product by providing an ejection pin position in the gate on a side of another surface faced in the up-down direction of the gate and in a portion of the ferrule body that does not overlap with the internal space in top view on the side of the other surface of the portion; and a cutting off step of cutting off the gate from the ferrule semi-finished product.

* * * * *